United States Patent [19]

Pan et al.

[11] Patent Number: 5,599,782
[45] Date of Patent: Feb. 4, 1997

[54] SOIL RELEASE AGENTS FOR GRANULAR LAUNDRY DETERGENTS

[75] Inventors: Robert Y. L. Pan, Blue Ash; Eugene P. Gosselink, Cincinnati; Eugene J. Pancheri, Montgomery, all of Ohio; Stephen W. Morrall, Guilford, Ind.

[73] Assignee: The Procter & Gamble Company, Cincinnati, Ohio

[21] Appl. No.: 576,263

[22] Filed: Dec. 21, 1995

Related U.S. Application Data

[63] Continuation of Ser. No. 265,566, Jun. 24, 1994, abandoned, which is a continuation of Ser. No. 905,487, Jun. 25, 1992, abandoned, which is a continuation of Ser. No. 579,742, Sep. 7, 1990, abandoned.

[51] Int. Cl.$^6$ .................. C11D 1/02; C11D 3/37
[52] U.S. Cl. .................. 510/299; 510/400; 510/517; 510/520
[58] Field of Search .................. 510/400, 299, 510/517, 528; 252/8.6, 8.9

[56] References Cited

U.S. PATENT DOCUMENTS

| | | | |
|---|---|---|---|
| 3,962,152 | 6/1976 | Nicol et al. | 252/551 |
| 4,116,885 | 9/1978 | Derstadt et al. | 262/532 |
| 4,238,531 | 12/1980 | Rudy et al. | 427/242 |
| 4,702,857 | 10/1987 | Gosselink | 252/DIG. 2 |
| 4,721,580 | 1/1988 | Gosselink | 252/8.7 |
| 4,877,896 | 10/1989 | Maldonado | 252/8.7 |
| 4,968,451 | 11/1990 | Scheibel et al. | 252/558 |
| 4,976,879 | 12/1990 | Maldonado et al. | 252/8.7 |
| 5,182,043 | 1/1993 | Morrall et al. | 252/174 |
| 5,196,133 | 3/1993 | Leslie et al. | 252/95 |
| 5,415,807 | 5/1995 | Gosselink | 252/174.21 |
| 5,486,297 | 1/1996 | Marin-Carrillo | 252/8.6 |

FOREIGN PATENT DOCUMENTS

| | | | |
|---|---|---|---|
| 1100262 | 5/1981 | Canada | D06M 13/34 |
| 0066944 | 12/1982 | European Pat. Off. | C08G 63/68 |
| 0311342 | 4/1989 | European Pat. Off. | C11D 3/37 |
| 0342887 | 11/1989 | European Pat. Off. | C11D 17/00 |
| 6098230 | 1/1980 | Japan . | |
| 2172608 | 9/1986 | United Kingdom | C11D 3/60 |

Primary Examiner—Douglas J. McGinty
Assistant Examiner—Kery Fries
Attorney, Agent, or Firm—Jerry J. Yetter; Kim W. Zerby; Brian M. Bolam

[57] ABSTRACT

Improved soil release agents for granular laundry detergents, typically used at levels as low as about 1% of a fully-formulated anionic surfactant-containing granular detergent, are reaction products of transesterifying and oligomerizing mixtures of monomers having the functions $MO_3SC_6H_4C(O)-$, $M'O_3SC_6H_3\{C(O)O-\}_2$, $-(O)CC_6H_4C(O)-$ and $-OCH_2CH_2O-$ wherein M and M' are independently selected from lithium, potassium and sodium, more preferably sodium; said mixtures having mole ratio of $MO_3SC_6H_4C(O)-$ to $-(O)CC_6H_4C(O)-$ of from about 0.2:1 to about 1.4:1, mole ratio of $MO_3SC_6H_4C(O)-$ to $M'O_3SC_6H_3\{C(O)O-\}_2$ of from about 0.67:1 to about 20:1 and mole ratio of $MO_3SC_6H_4C(O)-$ to $-OCH_2CH_2O-$ of from about 0.007:1 to about 0.51:1 and being substantially free from monomers of formula HOROH wherein R is propylene or higher alkyl.

9 Claims, No Drawings

SOIL RELEASE AGENTS FOR GRANULAR LAUNDRY DETERGENTS

This is a continuation of application Ser. No. 08/265,566, filed on Jun. 24, 1994, abandoned which is a continuation of application Ser. No 07/905,487, filed Jun. 25, 1992, abandoned, which is a continuation of Ser. No. 07/579,742, filed Sep. 7, 1990, now abandoned.

TECHNICAL FIELD

This invention relates to improved soil release agents (s.r.a.'s) for laundry detergents which contain a surfactant and have solid, e.g., granular form. More specifically, the s.r.a.'s are an improvement on certain known oligomeric terephthalate esters.

BACKGROUND OF THE INVENTION

"Soil release" herein is produced when fabrics, especially fabrics having a synthetic fiber component, are laundered in an aqueous bath in a domestic or institutional setting wherein the aqueous bath comprises at least one surfactant and a certain specific kind of oligomeric ester, typically at low levels such as five to a few tens of parts per million.

Soil release is especially pronounced on polyester fabrics. It is quite distinct from the usual cleaning effect of laundry detergent surfactants and builders, especially in that one or both of the following occur: (a) marked improvement in the release of oily soils from soiled fabrics over that which would be obtained using a surfactants and/or builder alone; and (b) multiwash effect, e.g., fabrics repetitively laundered tending to be cleaned progressively more easily over two, three or four wash-wear cycles.

Soil release in an aqueous laundry context is rather different from industrial finishing of yarns and fibers, warp-sizing and the like in terms of the general kinds of s.r.a. compositions which work best. This may be a consequence of some substantial differences in the process conditions. In any event, laundry s.r.a.'s of the type herein are typically applied to fabrics in washing-machines, with appreciable concentrations of soil as well as aqueous surfactant and builder present. The s.r.a. typically deposits to only a limited extent on the fabrics. In contrast, industrial finishing is commonly done in highly controllable process equipment, such as padders. Typically the textile is clean, and the concentration of cleaning agents (if any) tends to be low, at least at the stage at which it is desired to exhaust a soil release treatment onto a textile substrate.

Just as there are technical differences between laundering and industrial finishing, so too are there discernible differences between laundry detergent formula types such as granular, liquid, gel, paste-form, and dryer-added types of laundry detergent formulae. Formulators in the detergent arts are acutely aware of the problem that various forms of detergent compositions have their own built-in formulation constraints. For example, solid-formulated detergents need ingredients generally capable of dispersing or dissolving in aqueous laundry baths, while liquid formulae commonly need ingredients which are freely mixable without excessive chemical or physical interaction such as phase changes or precipitation.

In addition to differences between detergent formula types capable of affecting choice of soil release agent, it is part of the discovery leading to the present invention that soil release agents are not all equal in terms of their ability to function satisfactorily in the presence of anionic detergent surfactants. Indeed, anionic detergent surfactants tend to inhibit the function of soil release agents.

Whereas the foregoing background describes some of the principal ways in which laundry soil release agents are thought to work and points to some of the differences between laundry and industrial s.r.a. applications, it is not intended to limit "soil release" or "s.r.a." as applied herein to any particular theory of operation: it is fully in accordance with the present invention that under appropriate conditions of s.r.a. use as further described hereinafter, benefits over those mentioned hereinabove, even quite different from them, may also be obtained.

In general, materials capable of the above-outlined laundry "soil release" and which do not have as their primary function surfactancy, detergent building, industrial durable finishing or the like are termed "soil release agents" (s.r.a.) herein.

Set against this technical backdrop, the instant invention has to do with improving laundry-type s.r.a.'s, especially in light of the above-identified need for improved s.r.a.'s for working in the presence of granular laundry detergents containing anionic detergent surfactants. Moreover, the invention is specifically concerned with chemically modifying certain anionic oligomeric esters to act more effectively as soil release agents in granular laundry detergent formulae, as distinct from industrial finishes and liquid, gel, paste-form, or dryer-added substrate types of laundry detergent formulae.

Such preoccupations take into consideration that the consumer of laundry detergents, indeed the public at large, still uses large quantities of anionic surfactant-containing granular laundry detergents (despite the growing use of liquids) and is continually demanding improvements in their formulation, environmental compatibility, cleaning, soil release effectiveness and convenience (especially compactness of form) without desiring to see embodied in the cost of granular laundry detergent products too high a cost of improvement.

BACKGROUND ART

There are several disclosures in the art of polyesters, more particularly their lower molecular weight oligomers, capable of acting as s.r.a.'s in laundry products. The earlier disclosures relate to modified polyester-type materials which are not necessarily oligomeric and which contain segments without particular end-caps. They derive from ethylene glycol/dimethyl terephthalate randomly interspersed with polyether segments deriving from polyethylene glycol. See, for example, U.S. Pat. No. 3,962,152, Nicol et al, issued Jun. 8, 1976, U.S. Pat. No. 4,116,885, Derstadt et al, issued Sep. 7, 1978, Canadian Patent 1,100,262, Becker et al, issued May 5, 1981, U.S. Pat. No. 4,238,531, Rudy et al, issued Dec. 9, 1980, and British Patent Application 2,172,608, Crossin, published Sep. 24, 1986.

More recent developments in the field of s.r.a.'s for laundry detergent applications include certain end-capped ester oligomers, such those generally disclosed in United States Patents to Gosselink: see, for example, U.S. Pat. No. 4,702,857, issued Oct. 27, 1987, U.S. Pat. No. 4,721,580, issued Jan. 26, 1988 and U.S. Pat. No. 4,877,896, Maldonado, Trinh and Gosselink, issued Oct. 31, 1989. All of these Patents are incorporated herein by reference.

S.r.a.'s in accordance with the above-identified '896 patent in particular include certain oligomers which can be made from dimethyl terephthalate/ethylene glycol/propylene glycol/sodiosulfobenzoic acid, with sodiosulfoisophthalic acid being named as an optional additional comonomer.

It is an object of the present invention to further improve end-capped polyester oligomer s.r.a.'s (particularly those of the sulfoaroyl end-capped oligomeric ester variety) for soil release in anionic surfactant-containing granular laundry detergents.

It is a further object to provide improved granular laundry detergent compositions formulated with the improved s.r.a. Such detergents would very desirably include the phosphate-free type which is increasingly in demand.

These and other objects are secured, as will be seen from the following disclosure.

All percentages and proportions herein are by weight, unless otherwise indicated.

SUMMARY

The present invention provides improved s.r.a.'s for granular laundry detergent applications, especially for detergent formulae containing appreciable levels (e.g., about 5% or higher) of anionic detergent surfactants.

The s.r.a.'s are made by transesterifying and oligomerizing suitable mixtures of oligomerizable monomers having the functions $MO_3SC_6H_4C(O)$—, $M'O_3SC_6H_3\{C(O)O—\}_2$, —$(O)CC_6H_4C(O)$— and —$OCH_2CH_2O$— wherein M and M' are cations, especially sodium.

Numerous suitable monomers are illustrated hereinafter: one particularly useful monomer mixture consists essentially of a mixture of m-sodiosulfobenzoic acid (to provide $MO_3SC_6H_4C(O)$— functions), dimethyl sodiosulfoisophthalate (to provide $M'O_3SC_6H_3\{C(O)O—\}_2$ functions), dimethyl terephthalate (to provide —$(O)CC_6H_4C(O)$— functions) and ethylene glycol (to provide —$OCH_2CH_2O$— functions); all of these monomers being at proportions specified hereinafter. It is in particular especially important that the monomer mixtures have specific mole ratios of $MO_3SC_6H_4C(O)$— to —$(O)CC_6H_4C(O)$—, $MO_3SC_6H_4C(O)$— to $M'O_3SC_6H_3\{C(O)O—\}_2$ and $MO_3SC_6H_4C(O)$— to —$OCH_2CH_2O$—; and that the starting monomer mixtures should not contain monomers of formula HOROH wherein R is propylene or higher alkyl.

Transesterifying and oligomerizing the above-identified monomer mixtures is generally conducted in the presence of suitable catalysts, of types well-known in the art, under conditions described and illustrated in more detail hereinafter.

It is found necessary to carry out the transesterification and oligomerization to particular values of a "completion index", defined according to a Test Method given hereinafter. Completion index of the s.r.a. should generally be about 2.5 or higher.

S.r.a.'s made herein have a number of advantages over those heretofore described in the art. In particular, they are very useful for formulating at low levels, e.g., about 1%, in granular laundry detergents, especially those containing anionic detergent surfactants such as linear alkylbenzene-sulfonates. In such granular detergent formulae, effective soil release is secured despite the presence of the anionic surfactant. The s.r.a.'s herein are useful even in the presence of unsequestered water "hardness". Hence they are particularly useful in underbuilt laundry contexts. Moreover, it has been observed that the present s.r.a.'s provide unusual single-wash benefits on polyester fabrics. In particular, "soil anti-redeposition" benefits are seen for greasy/particulate soils such as motor oil/vacuum cleaner dirt in relation to the tendency of such soils to redeposit on polyester fabrics. Although it appears to operate on polyester instead of cotton, such a benefit may be thought of as somewhat analogous to the "soil anti-redeposition" effect of carboxymethylcellulose.

The invention encompasses a number of valuable embodiments, including but not limited to the improved soil release agents themselves, granular laundry detergents containing them, and methods of laundering fabrics with the s.r.a.'s.

DETAILED DESCRIPTION OF THE INVENTION

The present invention provides an improved oligomeric ester soil release agent (s.r.a.) for granular laundry detergent applications. The s.r.a. comprises the reaction product of the following procedure:

(a) providing a mixture of oligomerizable monomers, having the functions $MO_3SC_6H_4C(O)$—, $M'O_3SC_6H_3\{C(O)O—\}_2$, —$(O)CC_6H_4C(O)$— and —$OCH_2CH_2O$— wherein M and M' are independently selected from lithium, potassium and sodium, more preferably sodium; said mixture having a mole ratio of $MO_3SC_6H_4C(O)$— to —$(O)CC_6H_4C(O)$— of from about 0.2:1 to about 1.4:1, more preferably from about 0.25:1 to about 0.8:1, most preferably from about 0.33:1 to about 0.5:1, a mole ratio of $MO_3SC_6H_4C(O)$— to $M'O_3SC_6H_3\{C(O)O—\}_2$ of from about 0.67:1 to about 20:1, more preferably from about 1:1 to about 4:1, most preferably from about 1.43:1 to about 2.5:1; and a mole ratio of $MO_3SC_6H_4C(O)$— to —$OCH_2CH_2O$— of from about 0.007:1 to about 0.51:1, more preferably from about 0.018:1 to about 0.25:1, most preferably from about 0.048:1 to about 0.23:1; said mixture being substantially free from monomers of formula HOROH wherein R is propylene or higher alkyl; and (b) transesterifying and oligomerizing said mixture, in the presence of a catalyst, to a completion index of about 2.5 or higher, more preferably about 3.8 or higher, most preferably about 4.0 or higher, e.g., from about 4 to about 15. Even higher completion index is possible but can become increasingly expensive and provides no further benefit. Although all the monomers can be mixed at the outset, it is equally possible to combine them stagewise.

Preferably, the product is cooled quite rapidly to secure it as an amorphous solid. As a practical matter, this can generally be accomplished by any convenient method, e.g., allowing a flask of product from a small-scale preparation to cool naturally, laying out the hot product as a thin sheet on a metal surface, extruding it through a die, etc. The latter methods are excellent for large-scale production. Particular caution should be exercised with large-scale production if large tanks of hot molten product are produced: if such tanks are allowed to cool very slowly, the product may partially crystallize, and then, remarkably, its soil release properties can be adversely affected.

Preferred monomers for preparing the improved soil release agent comprise: at least one meta— $MO_3SC_6H_4C(O)$— monomer selected from the group consisting of m-sodiosulfobenzoic acid, methyl m-sodiosulfobenzoate and 2-hydroxyethyl m-sodiosulfobenzoate; at least one $M'O_3SC_6H_3\{C(O)O—\}_2$ monomer selected from the group consisting of dimethyl sodiosulfoisophthalate, sodiosulfoisophthalic acid and bis-2-hydroxyethyl sodiosulfoisophthalate; and at least one para—(O)CC$_6$H$_4$C(O)— monomer selected from the group consisting of dimethyl terephthalate, bis-2-hydroxyethyl terephthalate and 2-hydroxyethyl methyl terephthalate.

It is very preferable to use oligomerizable monomer mixtures which are substantially free from diethylene glycol, triethylene glycol and polyethylene glycol of formula HO(CH$_2$CH$_2$O)$_r$H wherein r is four or higher since such materials can adversely affect performance. Furthermore, the monomer mixtures are preferably substantially free from mineral acid impurities.

The invention encompasses numerous possible monomer mixtures, all perfectly suitable for making the s.r.a., as illustrated by:

(I) mixtures of m-sodiosulfobenzoic acid, dimethyl sodiosulfoisophthalate, dimethyl terephthalate and ethylene glycol;

(II) mixtures of m-sodiosulfobenzoic acid, sodiosulfoisophthalic acid, dimethyl terephthalate and ethylene glycol;

(III) mixtures of m-sodiosulfobenzoic acid, sodiosulfoisophthalic acid, bis-2-hydroxyethyl terephthalate and ethylene glycol;

(IV) mixtures of m-sodiosulfobenzoic acid, dimethyl sodiosulfoisophthalate, bis-2-hydroxyethyl terephthalate and ethylene glycol;

(V) mixtures of m-sodiosulfobenzoic acid, bis-2-hydroxyethyl sodiosulfoisophthalate, dimethyl terephthalate and ethylene glycol;

(VI) mixtures of methyl m-sodiosulfobenzoic acid, bis-2-hydroxyethyl sodiosulfoisophthalate, dimethyl terephthalate and ethylene glycol;

(VII) mixtures of m-sodiosulfobenzoic acid, dimethyl sodiosulfoisophthalate, terephthalic acid and ethylene glycol;

(VIII) mixtures of 2-hydroxyethyl m-sodiosulfobenzoic acid, dimethyl sodiosulfoisophthalate, dimethyl terephthalate and ethylene glycol;

(IX) mixtures of 2-hydroxyethyl m-sodiosulfobenzoic acid, bis-2-hydroxyethyl sodiosulfoisophthalate and bis-2-hydroxyethyl terephthalate.

(X) a mixture of m-sodiosulfobenzoic acid, dimethyl sodiosulfoisophthalate, 2-hydroxyethyl methyl terephthalate and ethylene glycol; and (XI) a mixture of 2-hydroxyethyl m-sodiosulfobenzoic acid, bis-2-hydroxyethyl sodiosulfoisophthalate, dimethyl terephthalate and ethylene glycol.

Very preferably, the oligomerizable monomer mixture for preparing the improved soil release agent is selected from:

(I) a mixture of m-sodiosulfobenzoic acid, dimethyl sodiosulfoisophthalate, dimethyl terephthalate and ethylene glycol;

(II) a mixture of m-sodiosulfobenzoic acid, sodiosulfoisophthalic acid, dimethyl terephthalate and ethylene glycol;

(III) a mixture of m-sodiosulfobenzoic acid, sodiosulfoisophthalic acid, bis-2-hydroxyethyl terephthalate and ethylene glycol;

(IV) a mixture of m-sodiosulfobenzoic acid, dimethyl sodiosulfoisophthalate, bis-2-hydroxyethyl terephthalate and ethylene glycol; and (V) a mixture of m-sodiosulfobenzoic acid, bis-2-hydroxyethyl sodiosulfoisophthalate, dimethyl terephthalate and ethylene glycol.

The best and most practical approach currently known is to use as the oligomerizable monomer mixture a mixture of m-sodiosulfobenzoic acid, dimethyl sodiosulfoisophthalate, dimethyl terephthalate and ethylene glycol in the above-noted proportions.

Product quality for soil release purposes is conveniently measured by the above-identified "completion index", which is an analytical parameter measurable according to the test method given hereinafter.

In an especially preferred embodiment, the invention encompasses an improved soil release agent for granular laundry detergents consisting essentially of the reaction product of: (a) providing an oligomerizable monomer mixture consisting essentially of m-sodiosulfobenzoic acid, dimethyl sodiosulfoisophthalate, dimethyl terephthalate and ethylene glycol; said mixture having a mole ratio of MO$_3$SC$_6$H$_4$C(O)— to —(O)CC$_6$H$_4$C(O)— of from about 0.33:1 to about 0.5:1, a mole ratio of MO$_3$SC$_6$H$_4$C(O)— to M'O$_3$SC$_6$H$_3$\{C(O)O—\}$_2$ of from about 1.43:1 to about 2.5:1; and a mole ratio of MO$_3$SC$_6$H$_4$C(O)— to —OCH$_2$CH$_2$O— of from about 0.048:1 to about 0.23:1; (b) transesterifying said oligomerizable monomer mixture as a substantially homogeneous highly sheared melt in the presence of a transesterification catalyst; (c) oligomerizing the product of step (b) in the melt under reduced pressure with concomitant removal of ethylene glycol excess;. (d) optionally, recycling the ethylene glycol excess, as recovered, to step (a); and (e) at a completion index of from about 4 to about 15, cooling, thereby securing said composition in amorphous solid form.

From this embodiment it will be clear that the proportions of the functional groups will differ in the product as compared with the starting proportions by virtue of the volatility of the ethylene glycol. Indeed it is currently difficult to precisely describe the product compositions in terms of complete chemical structure. Moreover, it has been discovered that a small but typically analytically detectable amount of moieties believed to be —O(CH$_2$CH$_2$OCH$_2$CH$_2$)O— can be formed and included in the s.r.a. even when no corresponding monomer has been used. These are often termed "diethylene glycol" moieties since the diol monomer which can be written by adding a hydrogen atom to each end of such a moiety is diethylene glycol. It has already been noted that such diols are not added as free monomers in synthesizing the most highly preferred s.r.a's.

Whatever the precise arrangement of the functional groups and their number in the product, the description herein permits the s.r.a. product to be made reproducibly and secures the full benefits of the invention.

Although generally known conditions of temperature, pressure and time can be used, in the preferred embodiments, the product is produced at a temperature in step (b) which is in the range from about 180° C. to about 195° C.; at a reduced pressure in step (c) of from about 0.001 mmHg to about 20 mmHg; and at a temperature in step (c) which is in the range from about 220° C. to about 300° C.

The time in step (b) is preferably from about 4 hours to about 24 hours, the pressure in step (b) is usually approximately atmospheric (slightly superatmospheric pressures can be helpful); and the time in step (c) is preferably from about 1 minute to about 18 hours.

Referring to the aforementioned preference to avoid mineral acid impurities, such impurities can catalyze by-product formation. Although paying attention to raw material quality will generally avoid such a problem, a particularly convenient way of dealing with this is to add in step (a) an additional component consisting of sodium acetate in an

7 amount of from about 0.5 mole % to about 3 mole % based on the sum of the moles of m-sodiosulfobenzoic acid and dimethyl sodiosulfoisophthalate.

EXPERIMENTAL

EXAMPLE I

Synthesis of S.r.a. of the Invention from M-Sodiosulfobenzoic Acid, Dimethyl Terephthalate, Ethylene Glycol and Dimethyl 5-Sodiosulfoisophthalate To a 250 ml, three-neck, round bottom flask equipped with a magnetic stirring bar, modified Claisen head, condenser (set for distillation—as distinct from reflux), thermometer, and temperature controller (THERM-O-WATCH I2R (TM), Instruments for Research and Industry, Cheltenham, Pa.) are added the following monomers: m-sodiosulfobenzoic acid (otherwise known as m-sulfobenzoic acid monosodium salt, Kodak, 18.7 g, 0.083 mol), dimethyl terephthalate (Aldrich, 48.4 g, 0.249 mol.), ethylene glycol (Baker, 75.0 g. 1.208 mol, and dimethyl 5-sodiosulfoisophthalate (otherwise known as dimethyl 5-sulfoisophthalic acid sodium salt, Aldrich, 16.0 g, 0.054 mol). Note that the foregoing amount of ethylene glycol is a substantial excess over the amount ultimately incorporated into the product s.r.a.

Catalyst, specifically hydrated monobutyltin oxide (M&T Chemicals, 0.30 g, 0.2% of the total weight of monomers) and acid control agent, specifically sodium acetate (Baker, 0.23 g, 2 mol % based on the sum of moles of m-sodiosulfobenzoic acid and dimethyl 5-sodiosulfoisophthalate) and 0.30 g BHT (butylated hydroxytoluene, Baker, 0.20 wt %), an antioxidant, are added. The entire system is swept with argon and then kept under an argon blanket.

The resulting mixture is heated to 180° C. with stirring. Temperature and stirring are continued overnight under argon while methanol, water and traces of ethylene glycol distil out. The next morning the temperature is raised to 190° C. and this temperature is maintained for 2 hours. A $^{13}$C-NMR (DMSO-$d_6$ solvent, reference=external tetramethylsilane, downfield shifts in delta units, positive) shows this stage of the reaction to be complete, on the basis that the resonance at ca. 52 ppm, attributed to methyl ester functionalities of starting dimethyl terephthalate and certain intermediates (such as methyl hydroxyethyl terephthalate) disappears.

The contents of the 250 ml three-neck round-bottom flask are now transferred to a 500 ml single neck, round-bottom flask and heated gradually (over ca. 55 min.) to 230° C. in a Kugelrohr apparatus (Aldrich) with reduced pressure of ca. 2.5 mmHg. A small amount of the homogeneous reaction mixture bumps over into the trap outside the Kugelrohr heating chamber. The reciprocation rate of the Kugelrohr is adjusted to get good mixing of the contents of the reaction flask and to spread the reaction mixture over the walls of the flask in a thin layer. The outside of the Kugelrohr heating chamber is insulated with glass wool to better retain heat and after a 230° C. reaction temperature is attained, the voltage to the heating element (controlling the Kugelrohr temperature) is reduced to achieve more even, constant heating. The THERM-O-WATCH regulator keeps the heat on ca. 70% of the time and off only ca. 30% of the time. The temperature, pressure and agitation are maintained for ca. 2 hrs. The flask, with its contents still under vacuum, is allowed to cool quite rapidly to room temperature by removing the lid of the Kugelrohr heating chamber and exposing the reaction flask to convection cooling by ambient air. The cooling takes about 30 min.

A $^{13}$C-NMR (DMSO-$d_6$) shows that a resonance at about 60 ppm, representing incompletely reacted monoesters of ethylene glycol, is only 1/8th the size of a new sizable resonance at ca. 63 ppm representing fully diesterified ethylene glycol. The ratio of the heights of the 63 ppm resonance to the 60 ppm resonance, defined as the "completion index" is thus about 8.0. See TEST METHOD, hereinafter. Resonances due to sulfoisophthalate incorporation are also present. The weight of the product s.r.a. is 57.0 g. It is a clear, glassy solid, light gold in color when examined in bulk. For convenience, the bulk s.r.a. can be ground up to a powder having granulometry approximately similar to the granular laundry detergent into which it will be formulated. On grinding, the color is white or off-white. The solubility of the freshly prepared s.r.a. is tested by weighing a small amount into a vial, crushing it into small particles, adding enough distilled water to make a 5% (wt.) solution and shaking vigorously. The material is soluble under these conditions.

A portion of the above-made soil release agent is subjected to about 2 hours of further treatment in the Kugelrohr under the above-described (230° C./2.5 mmHg) conditions. After this treatment, the $^{13}$C n.m.r. resonance at ca. 60 ppm has disappeared entirely or become unresolvable. The color has darkened only slightly and the solubility behavior is similar to the sample with completion index of 8.

A short-hand identification for the the s.r.a. produced in this example is "$SB_2 PET_6 SI_{1.3}$".

EXAMPLE II

Synthesis of S.r.a. of the Invention from M-Sulfobenzoic Acid Monosodium Salt, Dimethyl Terephthalate, Ethylene Glycol and Dimethyl 5-Sulfoisophthalate Sodium Salt To a 100 ml, three-neck, round bottom flask equipped with a magnetic stirring bar, modified Claisen head, condenser (set for distillation—as distinct from reflux), thermometer, and temperature controller (THERM-O-WATCH I2R (TM), Instruments for Research and Industry, Cheltenham, Pa.) are added the following monomers: m-sulfobenzoic acid monosodium salt, Kodak, 8.4 g, 0.037 mol), dimethyl terephthalate (Aldrich, 21.6 g, 0.111 mol.), ethylene glycol (Baker, 32.9 g. 0.530 mol.) and dimethyl 5-sulfoisophthalate sodium salt, Aldrich, 8.6 g, 0.029 mol). Hydrated monobutyltin oxide (M&T Chemicals, 0.15 g, 0.2% of the total reaction weight) and sodium acetate (Baker, 0.11 g, 2 mol % based on the sum of weights of m-sulfobenzoic acid sodium salt and dimethyl 5-sulfoisophthalate sodium salt) are added.

The resulting mixture is heated to 180° C. with stirring. Temperature and stirring are continued overnight under argon while methanol, water and traces of ethylene glycol distil out. A $^{13}$C-NMR (DMSO-$d_6$ solvent, reference=external tetramethylsilane, downfield shifts in delta units, positive) shows this stage of the reaction to be complete, on the basis that intermediates, having a resonance at ca. 52 ppm, disappear.

The contents of the 100 ml three-neck round-bottom flask are now transferred to a 500 ml single neck, round bottom flask and heated gradually (over ca. 20 min.) to 230° C. in a Kugelrohr apparatus (Aldrich). The Kugelrohr is set for efficient agitation: this keeps the surface area of the mixture large in relation to its volume. The Kugelrohr is at a reduced pressure of about 3 mm Hg. The temperature, pressure and agitation are maintained for ca. 3 hrs. The flask, with its contents still under vacuum, is allowed to cool quite rapidly to room temperature by exposing the outer surface of the flask to convection or forced air flow (ambient temperature air). The cooling takes about 30 min.

A $^{13}$C-NMR (DMSO-d$_6$) shows that a resonance at about 60 ppm, representing incompletely reacted monoesters of ethylene glycol, is unresolvable or absent. The same NMR of the product contains a new, sizeable resonance at ca. 63 ppm representing fully diesterified ethylene glycol. This indicates the completion index is greater than 15. Resonances due to sulfoisophthalate incorporation are also present. The weight of the product s.r.a. is 34.1 g. It is a glassy solid, generally yellow to orange when examined in bulk. For convenience, the bulk s.r.a. can be ground up to a powder having granulometry approximately similar to the granular laundry detergent into which it will be formulated. On grinding, the color is white or off-white. The solubility of the freshly prepared s.r.a. is tested by weighing a small amount of ground up or crushed s.r.a. into a vial, adding enough distilled water to make a 5% (wt.) solution and shaking vigorously. The material is soluble under these conditions.

EXAMPLE III

Synthesis of S.r.a. of the Invention from M-Sulfobenzoic Acid Sodium Salt, Dimethyl Terephthalate, Ethylene Glycol and 5-Sodiosulfoisophthalic Acid To a 100 ml, three-neck, round bottom flask equipped with a magnetic stirring bar, modified Claisen head, condenser (set for distillation—as distinct from reflux), thermometer, and temperature controller (THERM-O-WATCH I2R (TM), Instruments for Research and Industry, Cheltenham, Pa.) are added the following monomers: m-sodiosulfobenzoate (otherwise known as m-sulfobenzoic acid monosodium salt, Kodak, 8.4 g, 0.037 mol), dimethyl terephthalate (Aldrich, 14.8 g, 0.076 mol.), ethylene glycol (Baker, 32.9 g. 0.530 mol, this is a substantial excess over the amount ultimately incorporated into the product s.r.a.) and 5-sodiosulfoisophthalic acid (otherwise known as 5-sodiosulfoisophthalic acid monosodium salt, Aldrich, 5.00 g, 0.0186 mol). Hydrated monobutyltin oxide (M&T Chemicals, 0.12 g, 0.2% of the total weight of monomers) and sodium acetate (Baker, 0.06 g, 2 mol % based on m-sodiosulfobenzoate) are added.

The resulting mixture is heated to 180° C. with stirring. Temperature and stirring are continued overnight under argon while methanol, water and traces of ethylene glycol distil out. There is not generally any sublimation of solid reactants, but if solids do sublime, they are scraped back into the mixture. Accordingly, for all practical purposes, the monomers other than ethylene glycol are involatile. Since ethylene glycol is in excess as noted, the composition of the product is governed by the proportions of m-sodiosulfobenzoate, dimethylterephthalate and dimethyl 5-sodiosulfoisophthalate. A $^{13}$C-NMR (DMSO-d$_6$ solvent, reference= external tetramethylsilane, downfield shifts in delta units, positive) shows this stage of the reaction to be complete, on the basis that the resonance at ca. 52 ppm associated with methyl ester functionalities of starting material dimethyl terephthalate and certain intermediates (such as methyl hydroxyethyl terephthalate) disappears.

The contents of the 100 ml three-neck round-bottom flask are now transferred to a 500 ml single neck, round bottom flask and heated gradually (over ca. 20 min.) to 230° C. in a Kugelrohr apparatus (Aldrich) with reduced pressure of ca. 3 mm Hg. The reciprocation of the Kugelrohr is adjusted to get good mixing of the contents of the reaction flask and to spread the reaction mixture over the walls of the flask in a thin layer. The temperature, pressure and agitation are maintained for ca. 3 hr. The flask, with its contents still under vacuum, is allowed to cool quite rapidly to room temperature by exposing the outer surface of the flask to convection or forced air flow (ambient temperature air). The cooling takes about 30 min.

A $^{13}$C-NMR (DMSO-d$_6$) shows that a resonance at about 60 ppm, representing incompletely reacted monoesters of ethylene glycol, is unresolvable or absent. The same NMR of the product contains a new, sizeable resonance at ca. 63 ppm representing fully diesterified ethylene glycol. The completion index is greater than 15. Resonances due to sulfoisophthalate incorporation are also present. The weight of the product s.r.a. is 32.8 g. It is a glassy solid, a very light brown when examined in bulk. For convenience, the bulk s.r.a. can be ground up to a powder having granulometry approximately similar to the granular laundry detergent into which it will be formulated. On grinding, the color is white or off-white. The solubility of the freshly prepared s.r.a. is tested by weighing a small amount into a vial, crushing it into small particles, adding enough distilled water to make a 5% (wt.) solution and shaking vigorously. The material is completely soluble under these conditions.

EXAMPLE IV

Synthesis of S.r.a. of the Invention from M-Sodiosulfobenzoic Acid, Dimethyl Terephthalate, Ethylene Glycol, and 5-Sodiosulfoisophthalic Acid To a 250 ml, three-neck, round bottom flask equipped with a magnetic stirring bar, modified Claisen head, condenser (set for distillation—as distinct from reflux), thermometer, and temperature controller (THERM-O-WATCH, I2R (TM) Instruments for Research and Industry, Cheltenham, Pa.) are added the following monomers: m-sulfobenzoic acid (otherwise known as m-sulfobenzoic acid monosodium salt, Kodak, 22.4 g., 0.100 mole) and 5-sodiosulfoisophthalic acid (Aldrich, 13.4 g., 0.05 mole), and ethylene glycol (Baker, 86.8 g., 1.400 mole). This is a substantial excess over the amount ultimately incorporated into the product s.r.a.). Hydrated monobutyltin oxide (M&T Chemicals, 0.30 g., 0.24% of the weight of the reaction mixture) and sodium acetate (Baker 0.25 g., 2 mole % of the sum of the m-sodiosulfobenzoic acid and the sodiosulfoisophthalic acid) are added. The entire system is swept with argon and then kept under an argon blanket as the temperature is raised to 185° C. with stirring. Temperature and stirring are maintained while water and traces of ethylene glycol distil out. When the distillation of water essentially ceases (typically after about 12 hours), dimethyl terephthalate (Aldrich, 48.5 g., 0.25 mole) is added and the heating is continued for about 12–18 hours under argon until distillation of methanol essentially ceases. $^{13}$C-NMR (DMSO-d$_6$ solvent, reference=external tetramethylsilane, downfield shifts in delta units, positive) shows this stage of the reaction to be complete on the basis that the resonance at ca. 52 ppm associated with methyl ester functionalities of starting dimethyl terephthalate and certain intermediates (such as hydroxyethyl methyl terephthalate) disappears.

The contents of the 250 ml, three-neck, round-bottom flask are now transferred to a single-neck 500 ml round-bottom flask and heated gradually (over ca. 45 minutes) to 240° C. in a Kugelrohr apparatus (Aldrich) with reduced pressure of ca. 2.5 mm Hg. (The vacuum is also applied gradually to avoid bumping of reaction mixture out of the reaction vessel into the Kugelrohr trap.) The reciprocation rate of the Kugelrohr is adjusted to get good mixing of the contents of the reaction flask and to spread the reaction mixture over the walls of the flask in a thin layer. The outside of the Kugelrohr heating chamber is insulated with glass wool to better retain heat and after the reaction temperature is attained, the voltage to the heating element is reduced to achieve more even, constant heating. (THERM-O-WATCH regulator keeps the heat on ca. 70% of the time and off only ca. 30%.) The temperature, pressure and agitation are maintained for ca. 1.5 hour. The flask, with its contents still under vacuum, is allowed to cool quite rapidly to room temperature by removing the lid of the Kugelrohr heating chamber and exposing the reaction flask to convection cooling by ambient air. The cooling takes about 60 minutes.

A $^{13}$C-NMR (DMSO-$d_6$) shows a completion index of about 6. The weight of the product s.r.a. is about 85 g. It is a clear, glassy solid, gold in color when examined in bulk. The solubility of the freshly prepared s.r.a. is examined by adding a small amount to a vial, crushing it to small particles, adding enough distilled water to make a 5% solution, and shaking it vigorously. The material almost completely dissolves under these conditions.

EXAMPLE V

Synthesis of S.r.a. of the Invention from M-Sodiosulfobenzoate, Bis(2-Hydroxyethyl) Terephthalate, Ethylene Glycol, and Dimethyl 5-Sodiosulfoisophthalate Utilizing the equipment and reaction conditions of Example I (except for using a Kugelrohr condensation temperature of 240° C. for 1 hour), an oligomer is prepared from the following monomers: m-sulfobenzoic acid (otherwise known as m-sulfobenzoic acid monosodium salt, Kodak, 22.4 g., 0.100 mole), bis(2-hydroxyethyl) terephthalate (Polysciences, 57.1 g., 0.225 mole), ethylene glycol (Baker, 62.0 g., 1.00 mole. This, together with the ethylene glycol already incorporated in the bis(2-hydroyethyl) terephthalate, is a substantial excess over the amount ultimately incorporated into the product s.r.a.), and dimethyl 5-sodiosulfoisophthalate (otherwise known as dimethyl 5-sulfoisophthalate, sodium salt, Aldrich, 14.8 g., 0.050 mole). Hydrated monobutyltin oxide (M&T Chemicals, 0.31 g., 0.2 weight % of the total weight of monomers) and sodium acetate (Baker, 0.24 g., 2 mole % of the sum of the m-sulfobenzoic acid and sodiosulfoisophthalate), are added to provide catalysis and control of traces of mineral acid.

After cooling, the oligomer is obtained as a gold, glassy, brittle solid. A $^{13}$C-NMR (DMSO-$d_6$) shows that a resonance at about 59 ppm, representing incompletely reacted monoesters of ethylene glycol, is only ⅕th the size of a new sizable resonance at ca. 63 ppm representing fully diesterified ethylene glycol corresponding to a completion index of 8. Resonances due to sulfoisophthalate incorporation are also present. The weight of the product s.r.a. is about 80 g.

The solubility of the freshly prepared s.r.a. is examined by adding a small amount to a vial, crushing it to small particles, adding enough distilled water to make a 5% solution, and shaking it vigorously. The material totally dissolves under these conditions.

TEST METHOD

The following test method can be used to determine "completion index" of the s.r.a.'s of the invention.

1. The s.r.a. is well mixed as a melt to ensure representative sampling and is cooled rapidly from a temperature above the melting-point to well below the vitrification temperature, e.g., 45° C. or lower.
2. A solid sample of the bulk s.r.a. is taken.
3. A 10% solution of the s.r.a. in (methyl sulfoxide)-$d_6$ containing 1% v/v tetramethylsilane (Aldrich Chemical Co.) is made up. If necessary, warming to 90°–100° C. is used to achieve substantially complete dissolution of the s.r.a.
4. The solution is placed in a 180×5 mm NMR tube (Wilmad Scientific Glass, 507-pp-7 Royal Imperial thin-walled 5 mm NMR sample tubes, 8".)
5. The $^{13}$C NMR spectrum is obtained under the following conditions:
   a. General Electric QE-300 NMR instrument
   b. probe temperature=25° C.
   c. one pulse sequence d. pulse width = 6.00 microseconds
   = 30 degree e. acquisition time=819.20 msec
   f. recycle time=1.00 sec
   g. no. of acquisitions=5000
   h. data size=32768
   i. line broadening=3.00 Hz
   j. spin rate=13 rps
   k. observe:
      frequency=75.480824 MHz
      spec width=20,000 Hz
      gain=60*8
   l. decoupler:
      standard broad band, 64 modulation
      frequency=4.000 ppm
      power=2785/3000
   m. plot scale:
      510.64 Hz/cm
      6.7652 ppm/cm
      from 225.00 to −4.99 ppm 6. The height of the tallest resonance observed in the 63.0–63.8 ppm region (referred to as "the 63 peak" and associated with diesters of ethylene glycol) is measured. (This is often observed as a single peak under the specified conditions but may appear as a poorly resolved multiplet.)

7. The height of the tallest resonance observed in the 59.5–61.0 ppm region (referred to as "the 60 peak" and associated with monoesters of ethylene glycol is measured. (When this is large enough to distinguish from the baseline, it normally appears to be a single peak under the specified conditions.)

8. The completion index is calculated as the height ratio for the "63 peak" over the "60 peak".

Use of S.r.a. of the Invention in Granular Laundry Detergents

S.r.a. product of the invention is especially useful in granular laundry detergent compositions, which can be fully formulated compositions intended for use in the main laundering operation, or laundry additive or pretreatment compositions comprising the essential ester compositions and optional fabric cleaning ingredients. The s.r.a. compositions, as provided herein, will typically constitute from about 0.1% to about 10%, preferably from about 0.25% to about 3.0% by weight of a granular detergent. See the following patents, all incorporated herein by reference, for detailed illustrations of granular detergent compositions suitable for use in combination with the s.r.a. herein; these patents include disclosures of types and levels of typical detersive surfactants and builders: U.S. Pat. Nos. 3,985,669, Krummel et al., issued Oct. 12, 1976; 4,379,080, Murphy, issued Apr. 5, 1983; 4,490,271, Spadini et al., issued Dec. 25, 1984 and 4,605,509, Corkill et al., issued Aug. 12, 1986 (in the foregoing, granular detergent compositions have nonphosphorus builder systems; other nonphosphorus builders usable herein are the compounds tartrate monosuccinate/tartrate disuccinate, disclosed in U.S. Pat. No. 4,663,071, Bush et al., issued May 5, 1987 and 2,2'-oxodisuccinate, disclosed in U.S. Pat. No. 3,128,287, Berg, issued Apr. 7, 1964). Phosphorus-containing builders well-known in the art can also be used, as can bleaches; see U.S. Pat. No. 4,412,934, Chung et al., issued Nov. 1, 1983.

S.r.a.'s of the invention, at aqueous concentrations ranging from about 1 to about 50 ppm in aqueous laundry baths, more preferably about 5 to about 30 ppm, provide effective, combined cleaning and soil release treatments for polyester-containing fabrics (or, to a lesser extent, nylon or acrylic fabrics) washed in the bath. Such laundry baths are preferably alkaline (pH range about 7 to about 11, more preferably about 8 to about 10) and contain anionic surfactants, typically accompanied by additional granular detergent ingredients; including builders such as phosphates, ethercarboxylates or water-insoluble silicates (especially zeolite builders), and various commonly used adjuncts such as bleaches, enzymes, dispersants, fabric softeners, processing aids and optical brighteners. Surprisingly (especially insofar as anionic surfactant is concerned), all of these detergent ingredients can be present in the wash water at their art-disclosed levels, to perform their conventional tasks, e.g., for cleaning and bleaching fabrics or the like, without ill-effects on the soil release properties of the s.r.a.

Useful anionic surfactants in the granular laundry detergent compositions herein include the water-soluble salts of the higher fatty acids, i.e., "soaps". This includes alkali metal soaps such as the sodium, potassium, ammonium, and alkylolammonium salts of higher fatty acids containing from about 8 to about 24 carbon atoms, and preferably from about 12 to about 18 carbon atoms. Soaps can be made by direct saponification of fats and oils or by the neutralization of free fatty acids. Particularly useful are the sodium and potassium salts of the mixtures of fatty acids derived from coconut oil and tallow, i.e., sodium or potassium tallow and coconut soap.

Useful anionic surfactants also include the water-soluble salts, preferably the alkali metal, ammonium and alkylolammonium salts, of organic sulfuric reaction products having in their molecular structure an alkyl group containing from about 10 to about 20 carbon atoms and a sulfonic acid or sulfuric acid ester group. (Included in the term "alkyl" is the alkyl portion of acyl groups). Examples of this group of synthetic surfactants are the sodium and potassium alkyl sulfates, especially those obtained by sulfating the higher alcohols ($C_8$–$C_{18}$ carbon atoms) or such as those produced by reducing the glycerides of tallow or coconut oil; and the sodium and potassium alkylbenzene sulfonates in which the alkyl group contains from about 9 to about 15 carbon atoms, in straight chain or branched chain configuration, e.g., those of the type described in U.S. Pat. Nos. 2,220,099, and 2,477,383. Especially valuable are linear straight chain alkylbenzene sulfonates in which the average number of carbon atoms in the alkyl group is from about 11 to 13, abbreviated as $C_{11-13}$ LAS.

Other anionic surfactants herein are the sodium alkyl glyceryl ether sulfonates, especially those ethers of higher alcohols derived from tallow and coconut oil; sodium coconut oil fatty acid monoglyceride sulfonates and sulfates; sodium or potassium salts of alkylphenol ethylene oxide ether sulfates containing from about 1 to about 10 units of ethylene oxide per molecule and wherein the alkyl groups contain from about 8 to about 12 carbon atoms; and sodium or potassium salts of alkyl ethylene oxide ether sulfates containing about 1 to about 10 units of ethylene oxide per molecule and wherein the alkyl group contains from about 10 to about 20 carbon atoms.

Other useful anionic surfactants herein include the water-soluble salts of esters of alpha-sulfonated fatty acids containing from about 6 to 20 carbon atoms in the fatty acid group and from about 1 to 10 carbon atoms in the ester group; water-soluble salts of 2-acyloxyalkane-1-sulfonic acids containing from about 2 to 9 carbon atoms in the acyl group and from about 9 to about 23 carbon atoms in the alkane moiety; water-soluble salts of olefin and paraffin sulfonates containing from about 12 to 20 carbon atoms; and beta-alkyloxy alkane sulfonates containing from about 1 to 3 carbon atoms in the alkyl group and from about 8 to 20 carbon atoms in the alkane moiety.

Surfactants generally useful herein are not limited to those made from petroleum, a non-renewable carbon source: a variety of known surfactants from renewable or mixed synthetic/renewable carbon sources may also be used.

Preferred anionic surfactants are selected from the group consisting of $C_{11}$–$C_{13}$ linear alkylbenzene sulfonates, $C_{10}$–$C_{18}$ alkyl sulfates, and $C_{10}$–$C_{18}$ alkyl sulfates ethoxylated with an average of from about 1 to about 6 moles of ethylene oxide per mole of alkyl sulfate, and mixtures thereof.

Water-soluble nonionic surfactants are also useful in the compositions of the invention. Such nonionic surface-active materials include compounds produced by the condensation of alkylene oxide groups (hydrophilic in nature) with an organic hydrophobic compound, which may be aliphatic or alkyl aromatic in nature. The length of the polyoxyalkylene group which is condensed with any particular hydrophobic group can be readily adjusted to yield a water-soluble compound having the desired degree of balance between hydrophilic and hydrophobic elements.

Suitable nonionic surfactants include the polyethylene oxide condensates of alkyl phenols, e.g., the condensation products of alkyl phenols having an alkyl group containing from about 6 to 15 carbon atoms, in either a straight chain or branched chain configuration, with from about 3 to 12 moles of ethylene oxide per mole of alkyl phenol.

Preferred nonionic surfactants are the water-soluble and water-dispersible condensation products of aliphatic alcohols containing from 8 to 22 carbon atoms, in either straight-chain or branched configuration, with from about 3 to about 12 moles of ethylene oxide per mole of alcohol. Particularly preferred are the condensation products of alcohols having an alkyl group containing from about 9 to 15 carbon atoms with from about 4 to about 8 moles of ethylene oxide per mole of alcohol.

Nonionic surfactants useful herein typically exhibit reduced solubility with increasing temperature, reaching cloud-points which may vary widely. The formulator will normally avoid relatively low cloud-point nonionic surfactants when making granular laundry detergents for high-temperature (e.g., boilwash) application. Nonionic surfactants which are resistant to clouding across wide temperature ranges are very useful in making the instant granular laundry detergent compositions.

The granular detergent compositions herein generally comprise from about 5% to about 45%, preferably from about 10% to about 30%, most preferably from about 15% to about 25%, by weight of detergent surfactant. Fully-formulated granular compositions herein will preferably comprise: from about 0.5% to about 3% (more preferably about 0.75% to about 2%) of the s.r.a. of this invention; from about 10% to about 28% (more preferably about 15% to about 24%) of an anionic surfactant; from about 25% to about 75% (more preferably about 30% to about 55%) of a detergency builder; and from about 0% to about 5% (more preferably about 0.2% to about 2%) of a nonionic surfactant.

In addition to surfactant, granular laundry detergent compositions formulated with the instant s.r.a.'s typically contain builders. Nonlimiting examples of suitable water-soluble, inorganic detergent builders useful herein include: alkali metal carbonates, borates, phosphates, bicarbonates and silicates. Specific examples of such salts include sodium and potassium tetraborates, bicarbonates, carbonates, orthophosphates, pyrophosphates, tripolyphosphates and metaphosphates.

Examples of suitable organic alkaline detergency builders include: (1) water-soluble aminocarboxylates and aminopolyacetates, for example, nitrilotriacetates, glycinates, ethylenediaminetetraacetates, N-(2-hydroxyethyl)nitrilo diacetates and diethylenetriamine pentaacetates; (2) water-soluble salts of phytic acid, for example, sodium and potassium phytates; (3) water-soluble polyphosphonates, including sodium, potassium, and lithium salts of ethane-1-hydroxy-1,1-diphosphonic acid; sodium, potassium, and lithium salts of ethylene diphosphonic acid; and the like; (4) water-soluble polycarboxylates such as the salts of succinic acid, malonic acid, maleic acid, citric acid, 2,2'-oxodisuccinic acid, carboxymethyloxysuccinic acid, 2-oxa-1,1,3-propanetricarboxylic acid, 1,1,2,2-ethanetetracarboxylic acid, mellitic acid and pyromellitic acid; (5) water-soluble polyacetals as disclosed in U.S. Pat. Nos. 4,144,266 and 4,246,495 incorporated herein by reference; and (6) the water-soluble tartrate monosuccinates and tartrate disuccinates, and mixtures thereof, disclosed in U.S. Pat. No. 4,663,071 Bush et al, issued May 5, 1987, incorporated herein by reference.

Another type of detergency builder material useful in the final granular detergent product comprises a water-soluble material capable of forming a water-insoluble reaction product with water hardness cations preferably in combination with a crystallization seed which is capable of providing growth sites for said reaction product. Such "seeded builder" compositions are fully disclosed in British Patent No. 1,424,406.

A further class of detergency builder materials useful in the present invention are insoluble sodium aluminosilicates, particularly those described in Belgian Patent No. 814,874, issued Nov. 12, 1974, as having the formula:

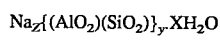

wherein z and y are integers equal to at least 6, the molar ratio of z to y is in the range of from 1.0:1 to about 0.5:1, and X is an integer from about 15 to about 264, said aluminosilicates having a calcium ion exchange capacity of at least 200 milligrams equivalent/gram and a calcium ion exchange rate of at least about 2 grain/gallon/minute/gram. A preferred material is Zeolite A having composition as generally known in the art, especially:

Particularly preferred zeolite A builders have very small particle sizes, e.g., from about 1 micron to about 10 micron.

The invention encompasses important phosphorus-containing, as well as phosphorus-free embodiments. Thus the builder can be any of tripolyphosphate, pyrophosphate, carbonate, polycarboxylate, or aluminosilicate, or mixtures thereof.

The detergency builder herein, when present, generally comprises up to about 95%, preferably from about 5% to 45%, most preferably from about 10% to 35%, by weight of the granular laundry detergent composition.

Optional components which can be included in the granular detergents herein are materials such as cationic surfactants, softening agents, enzymes (e.g., proteases and amylases), bleaches and bleach activators, other soil release agents (such as disclosed in U.S. Pat. Nos. 4,702,857, Gosselink, issued Oct. 27, 1987, and 4,721,580, Gosselink, issued Jan. 26, 1988, incorporated herein by reference), soil suspending agents, fabric brighteners, enzyme stabilizing agents, color speckles, suds boosters or suds suppressors, anticorrosion agents, dyes, fillers, germicides, pH adjusting agents, nonbuilder alkalinity sources, and the like. Materials which are heat-sensitive or degraded by other materials under the particular granule processing conditions, e.g., in crutcher mix slurries, are usually admixed with the processed granules to complete fully-formulated detergent compositions.

Any conventional granular laundry detergent manufacturing process, such as spray-drying, agglomeration, extrusion, flaking and dry-mixing can be used to prepare the granular laundry detergent compositions. However, the practitioner will generally avoid exposing the s.r.a. component to high-temperature alkaline hydrolysis, thermal shock or like process extremes which may spoil the efficiency of the s.r.a. Most preferably, the s.r.a. is ground to a particle size range which matches the balance of the granular laundry detergent composition, at least to the extent of not segregating significantly during normal storage. As the formulator will appreciate since it is well-known from the art, good size matching can be important especially when formulating any low-level dry-mixed ingredient in a granular laundry detergent composition.

Organic peroxyacids may also be formulated in bleach-containing granular laundry detergents herein (especially perborate or percarbonate-containing granular detergents). Such materials are illustrated by those disclosed in U.S. Pat. Nos. 4,374,035, Bossu, issued Feb. 15, 1983; 4,681,592, Hardy et al, issued Jul. 21, 1987; 4,634,551, Burns et al, issued Jan. 6, 1987; 4,686,063, Burns, issued Aug. 11, 1987; 4,606,838, Burns, issued Aug. 19, 1986; and 4,671,891, Hartman, issued Jun. 9, 1987. Examples of compositions suitable for laundry bleaching which contain perborate bleaches and activators therefor are further disclosed in U.S. Pat. Nos. 4,412,934, Chung and Spadini, issued Nov. 1, 1983; 4,536,314, Hardy et al, issued Aug. 20, 1985; 4,681,695, Divo, issued Jul. 21, 1987; and 4,539,130, Thompson et al, issued Sep. 3, 1985. All of the above patents are incorporated herein by reference. In general, the formulator will ensure that the bleach compounds used are compatible with the detergent formulation. Conventional tests, such as tests of bleach activity on storage in the presence of the separate or fully-formulated ingredients, can be used for this purpose.

Specific examples of preferred peroxyacids for this invention include diperoxydodecanedioic acid (DPDA), nonylamide of peroxysuccinic acid (NAPSA), nonylamide of peroxyadipic acid (NAPAA) and decyldiperoxysuccinic acid (DDPSA). For the purpose of this invention, the peroxyacid is preferably incorporated into a soluble granule according to the method described in the above-cited U.S. Pat. No. 4,374,035. A preferred bleach granule comprises, by weight, 1% to 50% of an exotherm control agent (e.g., boric acid); 1% to 25% of a peroxyacid-compatible surfactant (e.g., $C_{13}LAS$); 0.1% to 10% of one or more chelant stabilizers (e.g., sodium pyrophosphates); and 10% to 70% of a water-soluble processing salt (e.g., sodium sulfate).

The peroxyacid bleach is used at a level which provides an amount of available oxygen (AvO) from about 0.1% to about 10%, preferably from about 0.5% to about 5%, and most preferably from about 1% to about 4%, all by weight of the composition.

Effective amounts of peroxyacid bleach per unit dose of the composition of this invention used in typical laundry liquor, e.g., containing 64 liters of 16° C.–60° C. water, provide from about 1 ppm to about 150 ppm (parts per million, by weight) of available oxygen (AvO), more preferably from about 2 ppm to about 20 ppm. The laundry liquor should also have a pH of from 7 to 11, preferably 8 to 10, for effective peroxyacid bleaching. See Col. 6, lines 1–10, of U.S. Pat. No. 4,374,035.

The invention encompasses a method of laundering fabrics and concurrently providing a soil release finish thereto. The method simply comprises contacting said fabrics with an aqueous laundry liquor containing the conventional detersive ingredients described hereinabove, as well as the above-disclosed effective levels of the improved soil release agent of the invention. It is an important advantage of the invention to secure excellent soil release as used in granular detergents in which the surfactant is partially or even exclusively anionic.

Thus, a preferred method, for an optimized combination of cleaning and soil-release, provided by the invention, constitutes using all of the following:

preferred levels of soil release agent (5–30 ppm);

anionic surfactant;

pH of from about 8 to about 11 (typical of fully-formulated granular laundry detergents); and, by way of soil release agent, a preferred s.r.a. product of the invention, such as those illustrated hereinabove.

In the preferred method, polyester fabrics are used; best soil release results are achieved thereon, but other fabric types can also be present.

An unexpected benefit of the invention is that s.r.a.'s of the invention an impart combined soil release and greasy soil antiredeposition properties to granular laundry detergents. Greasy soil antiredeposition, as distinct from soil release, is a very pronounced one-wash effect in which the antiredeposition-active material protects a particular type of fabric from redeposition of cleaned-off soil suspended in the laundry bath. One common anti-redeposition agent for cotton is carboxymethylcellulose.

S.r.a of the invention is remarkably found to be active in a single wash cycle for protecting polyester fabrics from redeposition of suspended greasy soils such as motor oil/vacuum cleaner dirt.

Additionally, the more usual soil release properties described in the background of the invention are also exhibited. Thus, soil release effects on both polyester and polycotton fabrics generally can be determined using two, three or even more cycles. As used herein, a laundry/use cycle generally comprises the ordered sequence of steps:

a) contacting fabrics with an aqueous laundry bath in a conventional automatic washing machine for periods ranging from about 5 minutes to about 1 hour;

b) rinsing the fabrics with water;

c) line- or tumble-drying the fabrics; and d) exposing the fabrics to soiling through normal wear or domestic use.

In the above, hand-washing provides an effective but less preferred variant in step (a), wherein U.S. or European washing machines operating under their conventional conditions of time, temperature, fabric load, amounts of water and laundry product concentrations will give the best results. Also, in step (c), the "tumble-drying" to which is referred especially involves use of conventional domestic brands of programmable laundry dryers (these are occasionally integral with the washing machine), also using their conventional fabric loads, temperatures and operating times.

The following nonlimiting examples illustrate the use of a typical s.r.a. composition of the invention (that of Example I) as a soil release agent for thru-the-wash application to polyester fabrics.

EXAMPLES VI–VIII

Granular detergent compositions comprise the following ingredients:

| Ingredient | Percent (Wt) | | |
|---|---|---|---|
| | VI | VII | VIII |
| Sodium $C_{11}$–$C_{13}$ alkyl benzene sulfonate | 7.5 | 11.0 | 12.0 |
| $C_{12}$–$C_{13}$ alcohol ethoxylate (EO 6.5) | 1.0 | 0.0 | 1.0 |
| Sodium tallow alcohol sulfate | 7.5 | 0.0 | 7.5 |
| Sodium $C_{14}$–$C_{15}$ alkyl sulfate | 0.0 | 11.0 | 0.0 |
| Sodium tripolyphosphate | 25.0 | 30.0 | 0.0 |
| Sodium pyrophosphate | 6.0 | 5.0 | 0.0 |
| Zeolite A, hydrate (1–10 micron size) | 0.0 | 0.0 | 29.0 |
| Sodium citrate | 0.0 | 5.0 | 0.0 |
| Sodium carbonate | 17.0 | 12.0 | 17.0 |
| Sodium silicate (1:6 ratio $NaO/SiO_2$) | 5.0 | 16.0 | 2.0 |
| PEG 8,000 | 0.0 | 1.0 | 1.0 |
| Balance (can, for example, include water, soil dispersant, bleach, optical brightener, perfume, suds suppressor, process aids, or the like) | to 99.0 | | |

Aqueous crutcher mixes of the detergent compositions are prepared and spray-dried (except for heat sensitive ingredients such as bleaching agents, perfume, etc.), so that they contain the ingredients tabulated, at the levels shown. The ester composition of Example I is ground to a particle size distribution to match that of the granular detergent product, which typically is from about 400 to 1000 microns to minimize physical segregation. Particle sizes in this range are also preferred over smaller particle sizes which have a greater surface area to mass ratio, for best s.r.a. storage stability. The s.r.a. is admixed at the 1% level to bring the compositions of Examples VI, VII and VIII to 100%.

The detergent granules and s.r.a. are added (99 parts/1 part by weight, respectively), together with a 6 lb. load of previously laundered and soiled fabrics (load composition: 20 wt. % polyester fabrics/80 wt. % cotton fabrics), to a Sears KENMORE washing machine. Actual weights of detergent and s.r.a. are taken to provide the detergent concentrations of 1370 ppm or Examples I and VIII and 031 ppm for Example VII and to provide 10 ppm concentration of s.r.a. in the 17 l water-fill machine. The water used has 7 grains/gallon hardness and a pH of 7 to 7.5 prior to (about 9 to about 10.5 after) addition of the detergent and ester compositions.

The fabrics are laundered at 35° C. (95° F.) for a full cycle (12 min.) and rinsed at 21° C. (70° F.). The fabrics are then dried and are exposed to a variety of soils (by wear or controlled application). The entire cycle of laundering and soiling is repeated several times for each of the detergent compositions, with separate fabric bundles reserved for use with each of the detergent compositions. Excellent results are obtained in all cases (VI–VIII), especially in that polyester or polyester-containing fabrics laundered one or several times as described, display significantly improved removal of soils (especially oleophilic types) during laundering compared with fabrics which have not been exposed to the s.r.a. of the invention.

EXAMPLES IX–XIII

Granular detergent compositions comprise the following ingredients:

| Ingredient | Percent (Wt) | | | | |
| --- | --- | --- | --- | --- | --- |
| | IX | X | XI | XII | XIII |
| Sodium 12.3 linear alkyl benzene sulfonate | 3.6 | 16.9 | 12.0 | 9.0 | 8.0 |
| Sodium $C_{14}$-$C_{15}$ alkyl sulfate | 5.7 | 5.3 | 5.4 | 3.9 | 0.0 |
| Sodium tallow alcohol sulfate | 5.7 | 0.0 | 0.0 | 0.0 | 2.2 |
| $C_{12}$-$C_{13}$ alcohol ethoxylate (EO 6.5) | 1.0 | 0.5 | 0.9 | 0.4 | 3.0 |
| Sodium tripolyphosphate | 6.2 | 0.0 | 0.0 | 4.6 | 0.0 |
| Sodium pyrophosphate | 24.8 | 0.0 | 0.0 | 17.2 | 0.0 |
| Zeolite A, hydrate (1–10 micron size) | 0.0 | 26.1 | 17.9 | 0.0 | 23.0 |
| Citric acid | | 3.0 | 0.0 | 0.0 | 0.0 |
| Sodium carbonate | 17.0 | 18.3 | 22.7 | 22.0 | 15.0 |
| Sodium silicate (1.6 ratio $NaO/SiO_2$) | 3.7 | 2.0 | 3.0 | 7.2 | 4.0 |
| Polyethylene glycol 8000 | 0.5 | 1.7 | 1.2 | 0.3 | 0.0 |
| Sodium polyacrylate (MW 4500) | 1.2 | 3.8 | 1.7 | 1.0 | 5.0 |
| Protease enzyme/granulate | 0.35 | 2.2 | 0.45 | 0.37 | 1.6 |
| Sodium perborate monohydrate | 0.0 | 0.0 | 4.5 | 3.7 | 13.0 |
| Tetra acetyl ethylenediamine | 0.0 | 0.0 | 0.0 | 0.0 | 4.0 |
| Nonanoyloxybenzene sulfonate | 0.0 | 0.0 | 5.1 | 5.3 | |
| Sodium diethylenetriamine pentaacetate | 0.0 | 0.0 | 0.4 | 0.4 | 0.0 |
| Sodium sulfate | 29.5 | 10.5 | 16.4 | 21.1 | 1.5 |
| Soil release ester of Ex. I | 1.1 | 1.0 | 0.9 | 0.8 | 0.4 |
| Balance (including water, brightener, perfume, suds suppressor and in the case of Example X, silicone deairant) | to 100.0 | | | | |

Aqueous crutcher mixes of the detergent compositions are prepared and spray-dried, except for the enzyme, alkyl ethoxylate, bleach, perfume, citric acid and s.r.a. which are admixed, so that they contain the ingredients tabulated, at the levels shown. Additionally, in Example X, 50% of the Zeolite A ingredient is admixed as an agglomerate with LAS as the agglomerating agent.

Under U.S. conditions, the detergent composition is added, together with a 6 lb. load of previously laundered and soiled fabrics (load composition: 20 wt. % polyester fabrics/80 wt. % cotton fabrics), to a Sears KENMORE washing machine. Actual weights of detergent compositions are taken to provide a concentration of 1322 ppm for Composition IX, 1031 ppm for Composition X, and 1718 for Composition XI and XII, in the ca. 17 gal. (ca. 60 l) water-fill machine. The water used has 7 grains/gallon hardness and a pH of 7 to 7.5 prior to (about 9 to about 10.5 after) addition of the detergent and ester compositions.

The fabrics are laundered at 35° C. (95° F.) for a full cycle (12 min.) and rinsed at 21° C. (70° F.). The fabrics are then dried and are exposed to a variety of soils (by wear or controlled application). The entire cycle of laundering and soiling is repeated several times for each of the detergent compositions, with separate fabric bundles reserved for use with each of the detergent compositions. Similarly, under European conditions, the detergent composition is added, together with a 6 lb. load of previously laundered and soiled fabrics (load composition: 20 wt. % polyester fabrics/80 wt. % cotton fabrics), to a Miele washing machine. Actual weight of the detergent composition of Example XIII is taken to provide 6000 ppm in the 3.2 gallon water-fill machine. The water used has 21 grains/gallon hardness and a pH of 7–7.5 prior to addition of the detergent and ester compositions. The fabrics are laundered at 60° C. (140° F.) [alternately at 30° C. (86° F.) or 90° C. (194° F.)] for a full cycle (1 hr. at 60° C. or 90° C. or for 30 minutes at 30° C.) and rinsed at 23° C. (73° F.). The fabrics are then dried and are exposed to a variety of soils (by wear or controlled application). The entire cycle of laundering and soiling is repeated several times. Excellent results are obtained in all cases (IX–XII and XIII), especially in that polyester or polyester-containing fabrics (or even nylon and acrylic fabrics) laundered one or several times as described, display significantly improved removal of soils (especially oleophilic types) during laundering compared with fabrics which have not been exposed to the s.r.a. of the invention.

What is claimed is:

1. A laundry detergent composition comprising:

1) from about 5% to about 35% by weight of an anionic surfactant;

ii) from about 0% to about 95% by weight of a detergency builder;

iii) from about 0% to about 25% by weight of a nonionic surfactant; and iv) from about 0.25% to about 5.0% of an oligomeric ester soil release agent which consisting essentially of the reaction product prepared by (a) providing a mixture of oligomerizable monomers, having the functions $MO_3SC_6H_4C(O)$—, $M'O_3SC_6H_3\{C(O)O—\}_2$, —$(O)CC_6H_4C(O)$— and —$OCH_2CH_2O$— wherein M and M' are independently selected from lithium, potassium and sodium; said mixture having a mole ratio of $MO_3SC_6H_4C(O)$— to —$(O)CC_6H_4C(O)$— of from about 0.2:1 to about 1.4:1, a mole ratio of $MO_3SC_6H_4C(O)$— to $M'O_3SC_6H_3\{C(O)O—\}_2$ of from about 0.67:1 to about 20:1; and a mole ratio of $MO_3SC_6H_4C(O)$— to —$OCH_2CH_2O$— of from about 0.007:1 to about 0.51:1; provided that said mixture does not contain monomers of formula HOROH wherein R is propylene or higher alkyl; and (b) transesterifying and oligomerizing said mixture, in the presence of a catalyst, to a completion index of about 2.5 or higher.

2. A composition according to claim 1 wherein said monomers used to prepare said soil release agent comprise: at least one meta—$MO_3SC_6H_4C(O)$— monomer selected from the group consisting of m-sodiosulfobenzoic acid, methyl m-sodiosulfobenzoate and 2-hydroxyethyl m-sodiosulfobenzoate; at least one $M'O_3SC_6H_3\{C(O)O-\}_2$ monomer selected from the group consisting of dimethyl sodiosulfoisophthalate, sodiosulfoisophthalic acid and bis-2-hydroxyethyl sodiosulfoisophthalate; and at least one para—$(O)CC_6H_4C(O)$— monomer selected from the group consisting of dimethyl terephthalate, bis-2-hydroxyethyl terephthalate and 2-hydroxyethyl methyl terephthalate.

3. A composition according to claim 2 wherein prior to said transesterification and oligomerization, said oligomerizable monomer mixture is substantially free from diethylene glycol, triethylene glycol and polyethylene glycol of formula $HO(CH_2CH_2O)_rH$ wherein r is four or higher.

4. A composition according to claim 3 wherein said oligomerizable monomer mixture is selected from:

(I) a mixture of m-sodiosulfobenzoic acid, dimethyl sodiosulfoisophthalate, dimethyl terephthalate and ethylene glycol;

(II) a mixture of m-sodiosulfobenzoic acid, sodiosulfoisophthalic acid, dimethyl terephthalate and ethylene glycol;

(III) a mixture of m-sodiosulfobenzoic acid, sodiosulfoisophthalic acid, bis-2-hydroxyethyl terephthalate and ethylene glycol;

(IV) a mixture of m-sodiosulfobenzoic acid, dimethyl sodiosulfoisophthalate, bis-2-hydroxyethyl terephthalate and ethylene glycol; and (V) a mixture of m-sodiosulfobenzoic acid, bis-2-hydroxyethyl sodiosulfoisophthalate, dimethyl terephthalate and ethylene glycol.

5. A fully-formulated granular laundry detergent composition according to claim 1 having a density of from about 200 gram/l to about 1200 gram/l.

6. A method of laundering fabrics, comprising treating said fabrics with an aqueous laundry bath prepared by adding said granular laundry detergent of claim 1 to water.

7. A method according to claim 6 wherein said aqueous laundry bath is underbuilt.

8. A method according to claim 7 wherein said aqueous laundry bath is prepared by adding from about 500 ppm to about 10,000 ppm of said granular laundry detergent to water having a hardness of from about 1 grains/gallon to about 25 grains/gallon combined hardness.

9. A method for imparting a soil release finish to a fabric, comprising applying to said fabric the reaction product prepared by:

(a) providing a mixture which consists essentially of oligomerizable monomers, having the functions $MO_3SC_6H_4C(O)-$, $M'O_3SC_6H_3\{C(O)O-\}_2$, $-(O)CC_6H_4C(O)-$ and $-OCH_2CH_2O-$ wherein M and M' are independently selected from lithium, potassium and sodium; said mixture having a mole ratio of $MO_3SC_6H_4C(O)-$ to $-(O)CC_6H_4C(O)-$ of from about 0.2:1 to about 1.4:1, a mole ratio of $MO_3SC_6H_4C(O)-$ to $M'O_3SC_6H_3\{C(O)O-\}_2$ of from about 0.67:1 to about 20:1; and a mole ratio of $MO_3SC_6H_4C(O)-$ to $-OCH_2CH_2O-$ of from about 0.007:1 to about 0.51:1; provided that said mixture is substantially free from monomers of formula HOROH wherein R is propylene or higher alkyl; and (b) transesterifying and oligomerizing said mixture, in the presence of a catalyst, to a completion index of about 2.5 or higher.

* * * * *